(12) United States Patent
Mehalingam et al.

(10) Patent No.: US 9,875,098 B2
(45) Date of Patent: Jan. 23, 2018

(54) SYSTEM AND METHOD FOR EXTRACTING A BUSINESS RULE EMBEDDED IN AN APPLICATION SOURCE CODE

(71) Applicant: Tata Consultancy Services Limited, Mumbai (IN)

(72) Inventors: Tamildurai Mehalingam, Chennai (IN); Sangeetha Ramasamy, Chennai (IN); Navaneetha Krishnan Santhana Krishnan, Chennai (IN); Marimuthu Vadivel, Chennai (IN); Kumaran Annamalai, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/665,568

(22) Filed: Mar. 23, 2015

(65) Prior Publication Data

US 2015/0268955 A1 Sep. 24, 2015

(30) Foreign Application Priority Data

Mar. 24, 2014 (IN) .......................... 966/MUM/2014

(51) Int. Cl.
*G06F 9/44* (2006.01)
*G06Q 10/06* (2012.01)
(Continued)

(52) U.S. Cl.
CPC ................ *G06F 8/74* (2013.01); *G06F 8/433* (2013.01); *G06Q 10/06* (2013.01); *G06Q 10/10* (2013.01)

(58) Field of Classification Search
CPC ........... G06F 8/74; G06F 8/433; G06Q 10/06; G06Q 10/10
(Continued)

(56) References Cited

U.S. PATENT DOCUMENTS 6,016,477 A * 1/2000 Ehnebuske ............ G06Q 10/06
705/7.11
6,389,588 B1 * 5/2002 Wadhwa ................... G06F 8/74
717/106
(Continued)

FOREIGN PATENT DOCUMENTS

CA 2144483 * 3/1995 ............ G06F 17/00
CA 2144483 A1 10/1995
WO 2001079996 A1 10/2001

OTHER PUBLICATIONS

Linuxcommand—Shotts—Errors and Signals and Traps—Located at http://linuxcommand.org/wss0150.php 2015.*
(Continued)

*Primary Examiner* — Hossain Morshed
(74) *Attorney, Agent, or Firm* — Finnegan, Henderson, Farabow, Garrett & Dunner LLP (57) ABSTRACT

Disclosed is a method and system for extracting a business rule embedded in an application source code. The method comprises creating a call structure of one or more programs present in the application source code by performing a control flow analysis on the application source code. The method further comprises recognizing one or more parent programs and one or more child programs for a parent program. The method further comprises grouping the parent program and the one or more child programs into a group. Also, the method comprises identifying one or more conditional statements. The one or more conditional statements comprise the business rule. The one or more conditional statements are identified by comparing the plurality of conditional statements with pre-defined patterns identified from the application source code, and determining a conditional statement comparing a variable with a hard-coded value. The method further comprises mapping the one or more conditional statements with the business rule.

19 Claims, 5 Drawing Sheets

(51) Int. Cl.
*G06Q 10/10* (2012.01)
*G06F 9/45* (2006.01)

(58) Field of Classification Search
USPC .......................................................... 717/123
See application file for complete search history.

(56) References Cited

U.S. PATENT DOCUMENTS

| | | | | |
|---|---|---|---|---|
| 7,316,008 B1* | 1/2008 | Dutta | ....................... | G06F 8/74 717/136 |
| 8,412,653 B2 | 4/2013 | Marfatia et al. | | |
| 8,656,364 B1* | 2/2014 | Kolawa | ..................... | G06F 8/74 717/126 |
| 8,881,104 B2* | 11/2014 | Misra | ....................... | G06F 8/74 717/123 |
| 2002/0049749 A1* | 4/2002 | Helgeson | ................ | G06F 9/468 709/203 |
| 2005/0204340 A1* | 9/2005 | Ruminer | ................... | G06F 8/70 717/123 |
| 2007/0168309 A1* | 7/2007 | Tzruya | ................... | A63F 13/10 706/45 |
| 2007/0214099 A1* | 9/2007 | Marfatia | .................. | G06F 8/51 706/20 |
| 2008/0163159 A1* | 7/2008 | Oara | ........................ | G06F 8/10 717/104 |
| 2010/0083221 A1* | 4/2010 | Naik | ........................ | G06F 8/72 717/108 |
| 2012/0289787 A1* | 11/2012 | Kurgan | .............. | G06F 19/3418 600/300 |
| 2013/0042193 A1* | 2/2013 | Cai | ..................... | G06F 17/5004 715/771 |
| 2013/0080998 A1* | 3/2013 | He | ........................ | G06Q 10/06 717/123 |
| 2014/0067567 A1* | 3/2014 | Cooke | ................... | G06Q 20/18 705/21 |
| 2014/0109106 A1* | 4/2014 | Fanning | ................. | G06F 8/433 718/106 |
| 2014/0122377 A1* | 5/2014 | Goodman | ............. | G06Q 30/02 706/11 |
| 2014/0244241 A1* | 8/2014 | Ghaisas | ................. | G06F 17/27 704/9 |
| 2014/0282373 A1* | 9/2014 | Garza | ...................... | G06F 8/51 717/106 |
| 2014/0282396 A1* | 9/2014 | Manjarekar | .............. | G06F 8/74 717/120 |
| 2015/0142718 A1* | 5/2015 | Bostick | ................. | G06N 5/025 706/47 |
| 2015/0178625 A1* | 6/2015 | Berlandier | .......... | G06Q 10/067 706/11 |
| 2015/0268955 A1* | 9/2015 | Mehalingam | ............. | G06F 8/74 717/123 |

OTHER PUBLICATIONS

Bisseling-Partitioning a call graph-2005, Bisseling et al., Titiel: Partioning a Call Graph, Second International Workshop on Combinatorial Scientific Computing (2005) Located at: http://www.maths-in-industry.org/miis/87/1/callgraph.pdf.*

Zou et al., "An Approach for Extracting Workflows from E-Commerce Applications", 2006, IEEE International Conference on Program Comprehension.*

Wei Wu, "Extracting Business Rules and Removing Duplication With IRIS", École Ploytechnique De Montéal Stéphane Vaucher, Benchmark Consulting, Oct. 15, 2013, 22 pages.

Valerio Cosentino, Jordi Cabot, Patrick Albert, Philippe Bauquel,and Jacques Perronnet, "Extracting Business Rules from COBOL: A Model-Based Tool", Oct. 2, 2013, pp. 483-484, 2 pages.

* cited by examiner

SYSTEM AND METHOD FOR EXTRACTING A BUSINESS RULE EMBEDDED IN AN APPLICATION SOURCE CODE

CROSS-REFERENCE TO RELATED APPLICATIONS AND PRIORITY

This U.S. patent application claims the benefit of priority under 35 U.S.C. § 119 to India Patent Application No. 966/MUM/2014, filed on Mar. 24, 2014. The aforementioned application is incorporated herein by reference in its entirety.

TECHNICAL FIELD

The present subject matter described herein, in general, relates to extraction of a business rule, and more particularly to a system and method for extracting a business rule embedded in an application source code.

BACKGROUND

There exists an utmost need of transforming many software applications, developed using legacy code, to meet current generation business requirements. All the insurance applications dealing with products, rating, underwriting, policy services, bills, document management, regulatory reporting, claims, and actuary are a decade old and have business rules embedded in the legacy code.

Traditionally, transformation of the software applications involved studying the application source code and extracting business knowledge or business rules from the application source code. The traditional approach required a lot of manual effort and time. There exist solutions automating the transformation of the software applications to some extent. However, the process of extracting business rules implemented by the existing solutions is a computationally tedious and time consuming task.

Further, the business rules embedded in the application source code are often more complex than simple conditional statements. The application source code comprises of tangled rule flows with a combination of rule constructs evolved over a period of time. Thus, the complexity involved in extracting and transforming the business rules is very high.

SUMMARY

This summary is provided to introduce aspects related to systems and methods for extracting a business rule embedded in an application source code and the aspects are further described below in the detailed description. This summary is not intended to identify essential features of the claimed subject matter nor is it intended for use in determining or limiting the scope of the claimed subject matter.

In one implementation, a method for extracting a business rule embedded in an application source code is disclosed. The method comprises creating, by a processor, a call structure of one or more programs present in the application source code by performing a control flow analysis on the application source code. The method further comprises recognizing, from the one or more programs, one or more parent programs and one or more child programs for a parent program based on the call structure. The parent program is capable of calling the one or more child programs. The method further comprises grouping, by the processor, the parent program and the one or more child programs into a group; each program in the group comprises a plurality of conditional statements. Also, the method comprises identifying, by the processor, one or more conditional statements from the plurality of conditional statements, wherein the one or more conditional statements identified comprises the business rule. The one or more conditional statements are identified by performing at least one of, comparing the plurality of conditional statements with a plurality of pre-defined patterns identified from the application source code, wherein the plurality of predefined patterns comprises at least one pattern associated with the business rule, and at least another pattern lacking the business rule, and determining a conditional statement comparing a variable with a hard-coded value. The method further comprises mapping the one or more conditional statements with the business rule selected from at least one of a business rule stored in a pre-defined business rule template, and a business rule created using the pre-defined business rule template, thereby extracting the business rule embedded in the application source code.

In one implementation, a system for extracting a business rule embedded in an application source code is disclosed. The system comprises a processor and a memory coupled to the processor for executing a plurality of modules present in the memory. The plurality of modules comprises a creating module, a recognizing module, a grouping module, an identification module, and a mapping module. The creating module is configured to create a call structure of one or more programs present in the application source code by performing a control flow analysis on the application source code. The recognizing module is configured to recognize, from the one or more programs, one or more parent programs and one or more child programs for a parent program based on the call structure. The parent program is capable of calling the one or more child programs. The grouping module is configured to group the parent program and the one or more child programs into a group; each program in the group comprises a plurality of conditional statements. The identification module is configured to identify one or more conditional statements from the plurality of conditional statements. The one or more conditional statements identified comprise the business rule. The identification module is further configured to identify the one or more conditional statements by executing at least one of comparing the plurality of conditional statements with a plurality of pre-defined patterns identified from the application source code, wherein the plurality of predefined patterns comprise at least one pattern associated with the business rule, and at least another pattern lacking the business rule, and determining a conditional statement comparing a variable with a hard-coded value. The mapping module is configured to map the one or more conditional statements with the business rule selected from at least one of a business rule stored in a pre-defined business rule template, and a business rule created using the pre-defined business rule template, thereby extracting the business rule embedded in the application source code.

In one implementation, a non-transitory computer readable medium embodying a program executable in a computing device for extracting a business rule embedded in an application source code is disclosed. The program comprises a program code for creating a call structure of one or more programs present in the application source code by performing a control flow analysis on the application source code. The computer program product comprises a program code for recognizing, from the one or more programs, one or more parent programs and one or more child programs for a parent program based on the call structure. The parent program is capable of calling the one or more child programs. The computer program product further comprises a program code for identifying one or more conditional statements from the plurality of conditional statements. The one or more conditional statements identified comprise the business rule. The one or more conditional statements are identified by performing at least one of, comparing the plurality of conditional statements with a plurality of pre-defined patterns identified from the application source code, wherein the plurality of predefined patterns comprises at least one pattern associated with the business rule, and at least another pattern lacking the business rule, and determining a conditional statement comparing a variable with a hard-coded value. The computer program product further comprises a program code for mapping the one or more conditional statements with the business rule selected from at least one of a business rule stored in a pre-defined business rule template, and a business rule created using the pre-defined business rule template, thereby extracting the business rule embedded in the application source code.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and method(s) for extracting a business rule embedded in an application source code are described. At first, the application source code may be analyzed to create a call structure of one or more programs present in the application source. Further, one or more parent programs and one or more child programs for a parent program may be recognized based on the call structure. Further, the parent program and the one or more child programs may be grouped. Each group may comprise a plurality of conditional statements.

Subsequently, one or more conditional statements comprising the business rule may be identified by comparing the plurality of conditional statements with a plurality of pre-defined patterns identified from the application source code. The plurality of predefined patterns may comprise at least one pattern associated with the business rule, and at least another pattern lacking the business rule. Further, a conditional statement comprising the business rule may be identified by comparing a variable with a hard-coded value.

Subsequently, the one or more conditional statements may be mapped with the business rule. The business rule may be selected from a business rule stored in a pre-defined business rule template, and a business rule created using the pre-defined business rule template.

While aspects of described system and method for extracting a business rule embedded in an application source code may be implemented in any number of different computing systems, environments, and/or configurations, the embodiments are described in the context of the following exemplary system.

Figure 1:
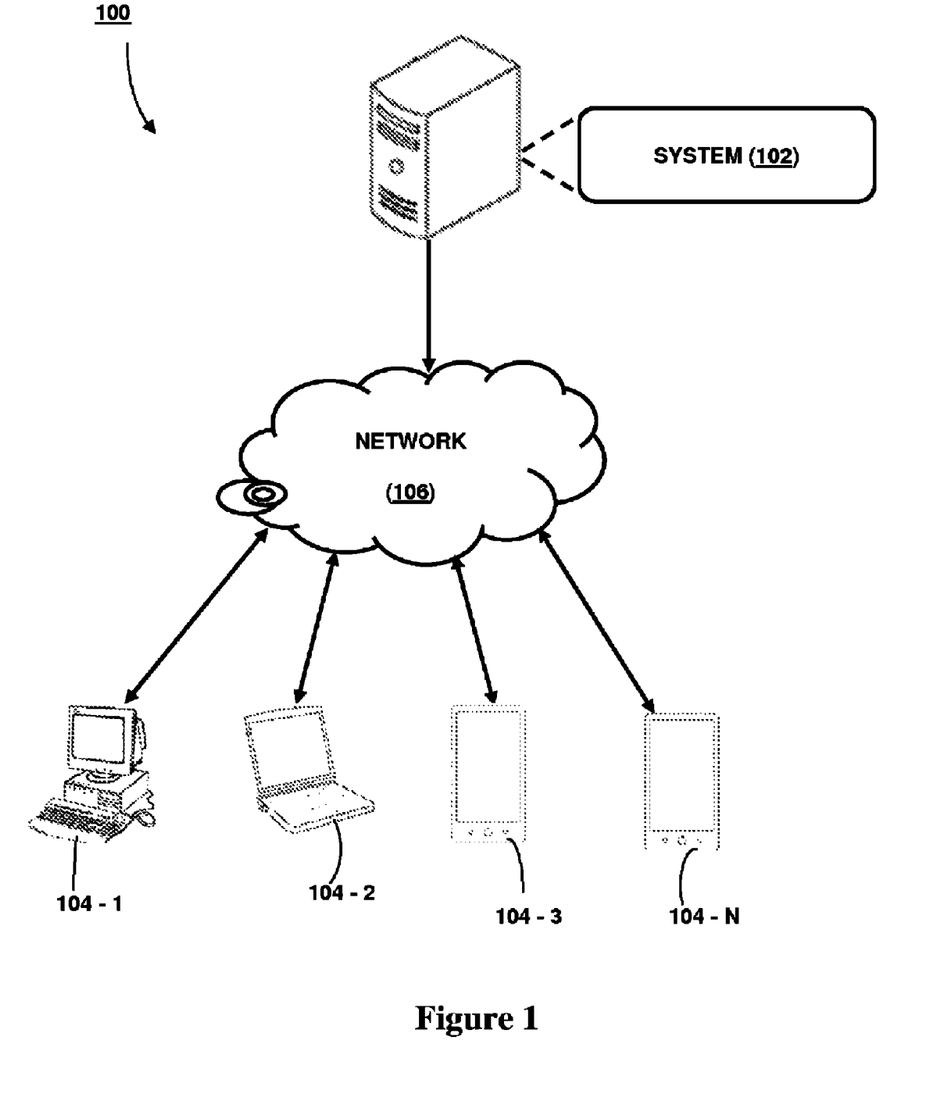
FIG. 1 illustrates a network implementation of a system for extracting a business rule embedded in an application source code is shown, in accordance with an embodiment of the present subject matter.

Referring now to FIG. 1, a network implementation 100 of a system 102 extracting a business rule embedded in an application source code is illustrated, in accordance with an embodiment of the present subject matter. In one embodiment, the system 102 provides for extracting the business rule embedded in the application source code. In one embodiment, the system 102 may create a call structure of one or more programs present in the application source code and extract technical details. Further, the one or more programs may be grouped. Each group may comprise a plurality of conditional statements. Further, one or more conditional statements comprising the business rule may be identified by comparing the plurality of conditional statements with a plurality of pre-defined patterns. The system 102 may further determine a conditional statement comprising the business rule by comparing a variable with a hard-coded value. The business rule may be further extracted by mapping the one or more conditional statements with the business rule selected from a business rule stored in a pre-defined business rule template, and a business rule created using the pre-defined business rule template.

Although the present subject matter is explained considering that the system 102 is implemented on a server, it may be understood that the system 102 may also be implemented in a variety of computing systems, such as a laptop computer, a desktop computer, a notebook, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
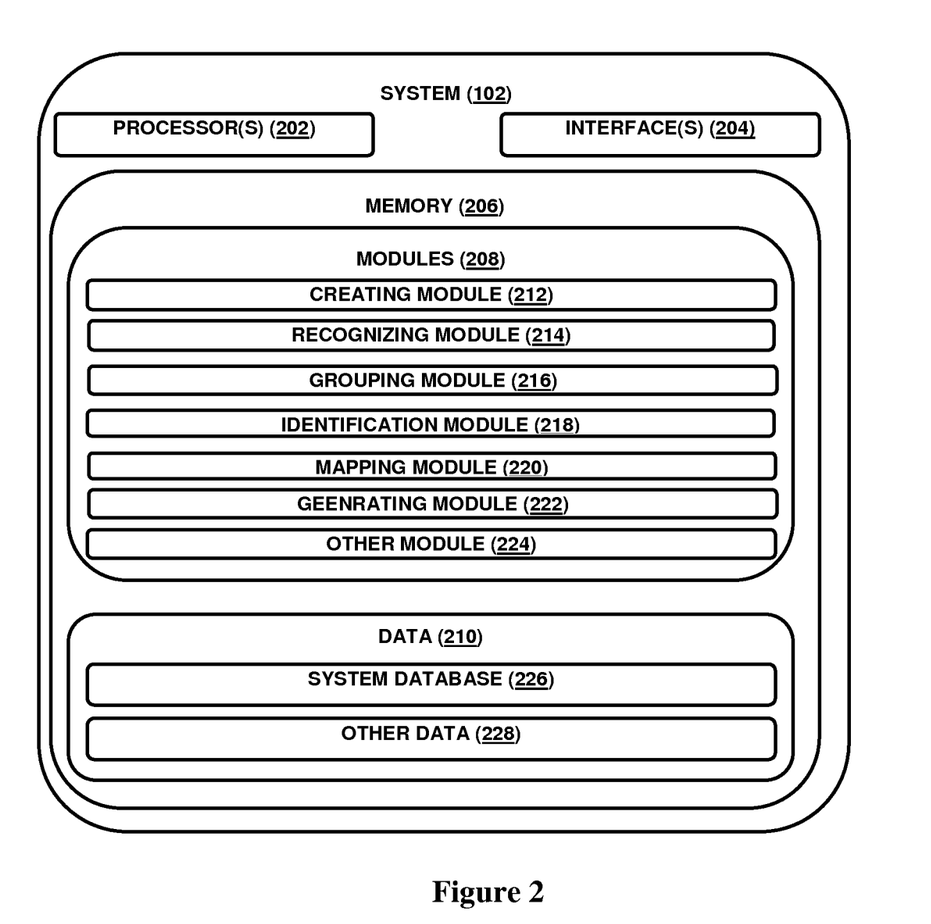
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a creating module 212, a recognizing module 214, a grouping module 216, an identification module 218, a mapping module 220, a generating module 222, and other modules 224. The other modules 224 may include programs or coded instructions that supplement applications and functions of the system 102.

The data 210, amongst other things, serves as a repository for storing data processed, received, and generated by one or more of the modules 208. The data 210 may also include a system database 226, and other data 228. The other data 228 may include data generated as a result of the execution of one or more modules in the other modules 224.

In one implementation, at first, a user may use the client device 104 to access the system 102 via the I/O interface 204. The user may register themselves using the I/O interface 204 in order to use the system 102. The working of the system 102 may be explained in detail in FIGS. 3 and 4 explained below. The system 102 may be used for extracting a business rule embedded in an application source code. In order to extract the business rule embedded in the application source code, the system 102, at first, creates a call structure of one or more programs present in the application source code. Specifically, in the present implementation, the call structure may be created by the creating module 212.

In one implementation, the creating module 212 may be configured to create the call structure of the one or more programs present in the application source code by performing a control flow analysis on the application source code. The control flow analysis may determine a control flow between the one or more programs. The control flow may be expressed as a control flow graph. The control flow analysis may be performed using techniques comprising abstract representation, resolving dynamic calls, object resolutions, and control transfers.

In one implementation, the creating module 212 may further extract technical details present in the application source code. The technical details comprises lines of code present in the one or more programs, flow within a program, calls to paragraphs and methods in the one or more programs, access to one or more databases, access to files, one or more conditional statements, and one or more cross references in the one or more programs.

The system 102 further comprises the recognizing module 214. The recognizing module 214 may be configured to identify, from the one or more programs, one or more parent programs and one or more child programs for a parent program. The one or more parent programs and the one or more child programs for the parent program may be recognized based on the call structure. Further, the parent program may be capable of calling the one or more child programs. The call structure enables the recognizing module 214 to establish a relation or dependency between the one or more programs. By way of a non-limiting example, a program CSLMGNT.COB may be called from a program ASLMGNT.COB. Thus, the recognizing module 214 recognizes the program ASLMGNT.COB as the parent program and the program CSLMGNT.COB as the child program.

The system 102 further comprises the grouping module 216. The grouping module 216 may be configured to group the parent program and the one or more child programs into a group. By way of a non-limiting example, the program CSLMGNT.COB and the program ASLMGNT.COB may be grouped into a same group. Further, the grouping may be done based on identical characteristics of the one or more programs. The identical characteristics may comprise the one or more programs starting with same naming convention. In another implementation, the grouping of the one or more programs may be done based on the user's choice.

Further, each program in the group comprises a plurality of conditional statements. For example, the plurality of conditional statements may be one of a single or multiple set of conditions involved in various decision making statements. The decision making statements may comprise IF, WHEN, or SWITCH—CASE. One or more conditional statements of the plurality of conditional statements may comprise the business rule. By way of a non-limiting example, a conditional statement of the one or more conditional statements comprising the business rule may be IF ACCT-RETURN-CODE=EXISTING-ACCOUNT
MOVE L-ACCOUNT-ID OF ACCOUNT-COPY TO AC-ID
END-IF.

The system 102 further comprises the identification module 218. The identification module 218 may be configured to identify the one or more conditional statements from the plurality of conditional statements. In one implementation, the identification module 218 may be configured to identify the one or more conditional statements by comparing the plurality of conditional statements with a plurality of pre-defined patterns. The plurality of pre-defined patterns may be identified from the application source code. The plurality of pre-defined patterns may further comprise patterns added newly by the user. The plurality of predefined patterns may further comprise at least a pattern associated with the business rule, and at least a pattern lacking the business rule.

A pre-defined pattern of the plurality of pre-defined patterns may be a regular expression or a full match text. The pre-defined pattern may be a search pattern defined using the regular expression or the full match text. When the pre-defined pattern may be the regular expression, complex patterns may be defined to identify the one or more conditional statements. By way of a non-limiting example, the pre-defined pattern for a word starting with 'CU' and ending with 'R' may be defined as ^CU.*R$. The pre-defined pattern may be further searched for in the plurality of conditional statements. The one or more conditional statements matching the pre-defined pattern may be thus identified.

In one implementation, the pre-defined pattern may be a pattern associated with the business rule. By way of a non-limiting example, a pattern 'ACCT' may be defined to identify the one or more conditional statements comprising the business rule. Referring to the conditional statement and a set of statements executed on a condition specified by the conditional statement is illustrated below:

IF ACCT-RETURN-CODE=EXISTING-ACCOUNT
MOVE L-ACCOUNT-ID OF ACCOUNT-COPY TO AC-ID
END-IF.

The conditional statement "IF ACCT-RETURN-CODE=EXISTING-ACCOUNT" may be identified as the conditional statement comprising the business rule by comparing the conditional statement with the pre-defined pattern 'ACCT'.

By way of another non-limiting example, a pattern 'CUSTOMER' may be defined. The plurality of conditional statements present in a program BOXTRFMO.COB in the group may be compared with the pattern 'CUSTOMER'. The one or more conditional statements such as,
"IF WS-CUST-RETURN-CODE EQUAL NEW-CUSTOMER", and "IF WS-CUST-RETURN-CODE EQUAL EXISTING-CUSTOMER", matching the pattern 'CUSTOMER' may be identified.

In another implementation, the pre-defined pattern may be the pattern lacking the business rule. The plurality of conditional statements may be compared with the pattern lacking the business rule. The one or more conditional statements matching with the pattern lacking the business rule may be excluded, as the one or more conditional statements do not comprise the business rule. The one or more conditional statements lacking the business rule may be further categorized into a set of excluded conditional statements. Thus, the set of excluded conditional statements may not be considered for mapping to the business rule, thereby saving computational power of the processor and increasing efficiency of the processor.

By way of a non-limiting example, the pre-defined pattern lacking the business rule may be 'SQLCODE'. The plurality of the conditional statements may be compared with the pre-defined pattern 'SQLCODE'. The one or more conditional statements matching the pre-defined pattern 'SQLCODE' may be excluded and grouped into the group of excluded conditional statements. For example, the one or more conditional statements matching the pre-defined pattern 'SQLCODE' are illustrated in the following code snippet.

EVALUATE SQLCODE
WHEN 1
MOVE ACCOUNT-OPERFAIL TO WS-ACCT-RETURN-CODE
WHEN 0
MOVE ACCOUNT-OPERSUCC TO WS-ACCT-RETURN-CODE
END EVALUATE

The one or more conditional statements from the above code snippet,
WHEN 1
MOVE ACCOUNT-OPERFAIL TO WS-ACCT-RETURN-CODE
WHEN 0
MOVE ACCOUNT-OPERSUCC TO WS-ACCT-RETURN-CODE
may be excluded, as the one or more conditional statements do not comprise the business rule.

Further, by way of another non-limiting example, the one or more conditional statements which may not comprise the business rule may be,
IF lst_error.number< >FAILURE THEN
IF li_rc< >0 THEN
IF li_ret=−1 THEN In another implementation, the identification module 218 may be configured to identify the one or more conditional statements comprising the business rule by determining a conditional statement comparing a variable with a hard-coded value. The hard-coded value may be a constant value. The conditional statement comparing the variable with the constant value may have a business meaning. The business meaning may be embedded in terms of the business rule in the conditional statement. By way of a non-limiting example, the conditional statement comparing the variable with the constant value may be 'IF WS-SRC-BALANCE>0', or 'IF WS-AMOUNT>0'. The constant value '0' in the conditional statement 'IF WS-SRC-BALANCE>0', or 'IF WS-AMOUNT>0' may indicate the business rule, "Account balance is very low".

Further, by way of another non-limiting example, consider a code snippet illustrated below,
IF PIGAC-STATE-CODE='SD' AND
(PIGAC-COVERAGE-TYPE-CODE='13100' OR
PIGAC-COVERAGE-TYPE-CODE='13101') AND
PBGRR-CVG-RULE-CD='L12E12' AND
PBGRR-CVG-RULE-ACT-CD='CSED'
IF PIGAC-VALUE-AMT1-D>100000
   MOVE 100000 TO PSG34-VALUE-AMT1
ELSE
   MOVE PIGAC-VALUE-AMT1-D
   TO PSG34-VALUE-AMT1
END-IF
IF PIGAC-VALUE-AMT2-D>300000
   MOVE 300000 TO PSG34-VALUE-AMT2
ELSE
   MOVE PIGAC-VALUE-AMT2-D
   TO PSG34-VALUE-AMT2

In the above code snippet, the conditional statements, 'IF PIGAC-STATE-CODE='SD'" and 'IF PIGAC-VALUE-AMT2-D>300000' compare a variable PIGAC-STATE-CODE' and a variable PIGAC-VALUE-AMT2-D' with hard-coded values 'SD' and '300000'.

In one implementation, the identification module 218 may be further configured to categorize the one or more conditional statements comprising the business rule into categories. The categories may comprise a set of the one or more conditional statements matching with the pre-defined pattern, and a set of the one or more conditional statements comparing the variable with the hard-coded value. The one or more conditional statements lacking the business rule may be categorized into the set of excluded conditional statements. The set of the one or more conditional statements matching with the pre-defined pattern may further comprise sub-sets according to the pre-defined patterns. For example, the sub-sets may be 'CUSTOMER' and 'ACCT'. The sub-set 'CUSTOMER' may comprise the one or more conditional statements matching with the pre-defined pattern 'CUSTOMER' and the sub-set 'ACCT' may comprise the one or more conditional statements matching with the pre-defined pattern 'ACCT'.

Further, the system 102 comprises the generating module 222. The generating module 222 may be configured to generate a hierarchy of the one or more conditional statements comprising the business rule. The hierarchy of the one or more conditional statements defines parent conditional statements, and child conditional statements dependent on the parent conditional statements. The parent conditional statements and the child conditional statements are nested conditions. In another implementation, the parent conditional statements and the child conditional statements may occur in different sub-entities. The sub-entities may be different paragraphs in the program. By way of a non-limiting example, consider a code snipped illustrated below, CHECK-CUSTOMER
  IF  WS-CUST-RETURN-CODE=CUSTOMER-OPER-FAIL
    MOVE  'CUSTOMER  CHECK  FAILED'  TO WS-MESSAGE-STRING
    PERFORM DISPLAY-MESSAGE-ROUTINE In the above code snippet the hierarchy may be generated between the one or more conditional statements 'CHECK-CUSTOMER', and IF WS-CUST-RETURN-CODE=CUSTOMER-OPERFAIL. The conditional statement 'CHECK-CUSTOMER' may be the parent conditional statement, and the conditional statement 'IF WS-CUST-RETURN-CODE=CUSTOMER-OPERFAIL' may be the child conditional statement dependent on the parent conditional statement.

The system 102 further comprises the mapping module 220. The mapping module 220 may be configured to map the one or more conditional statements with the business rule. The business rule may be selected from at least one of a business rule stored in a pre-defined business rule template, and a business rule created using the pre-defined business rule template. The pre-defined business rule template may be defined for a plurality of business domains. The plurality of business domains comprises rating, insurance, and pharmacy.

Further, referring to table 1, a sample pre-defined template is illustrated. The sample pre-defined template may comprise parameters. The parameters may be configurable. Further, the parameters may comprise a parameter name, a parameter type, and a mandatory flag. The parameter name may comprise rule name, rule description, rule id, and rule type. The parameter type may comprise at least one of a text box, a text area, and a control field. Further, the mandatory flag may be set to at least a yes, or a no.

TABLE 1

| Parameter name | Parameter Type | Mandatory Flag |
| --- | --- | --- |
| Rule Name | Text box | Yes |
| Rule Description | Text area | Yes |
| Rule Id | Text box | Yes |
| Program Name | Text box | No |
| Rule Type | Text box | Yes |
| Line Of Business | Text box | No |
| Channel | Text box | No |
| Product | Text box | No |
| Rating Company | Text box | No |
| State | Text box | No |
| Transaction Type | Text box | No |

Figure 3:
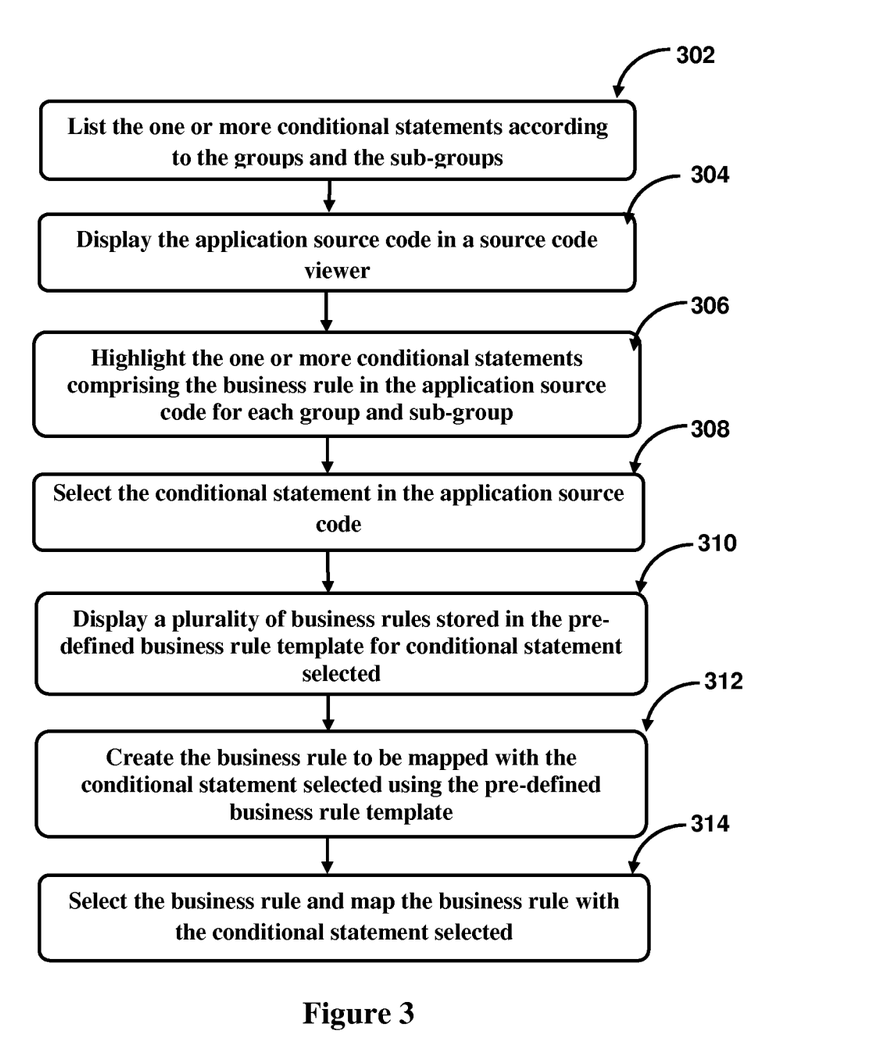
FIG. 3 illustrates a method for mapping one or more conditional statements with the business rule, in an exemplary embodiment of the present subject matter.

In one implementation of the system 102, referring to FIG. 3, a method for mapping the one or more conditional statements with the business rule is illustrated. At step 302, the one or more conditional statements may be listed according to the groups and the sub-groups. Further, at step 304, the application source code may be displayed in a source code viewer on the I/O interface 204, corresponding to each group and sub-group. At step, 306, the one or more conditional statements comprising the business rule may be highlighted in the application source code for each group and sub-group. Next, at step 308, the user may select the conditional statement in the application source code. Further, at step 310, for the conditional statement selected, a plurality of business rules stored in the pre-defined business rule template may be displayed. Alternatively, at step 312, the business rule to be mapped with the conditional statement selected may be created by the user using the pre-defined business rule template. At step 314, the user may select the business rule and map the business rule with the conditional statement selected.

In one implementation, the mapping module 220 may be further configured to map related conditional statements to the business rule. The related conditional statements may comprise the parent conditional statements and the child conditional statements, the one or more conditional statements comparing the variable against a same hard coded value.

Figure 4:
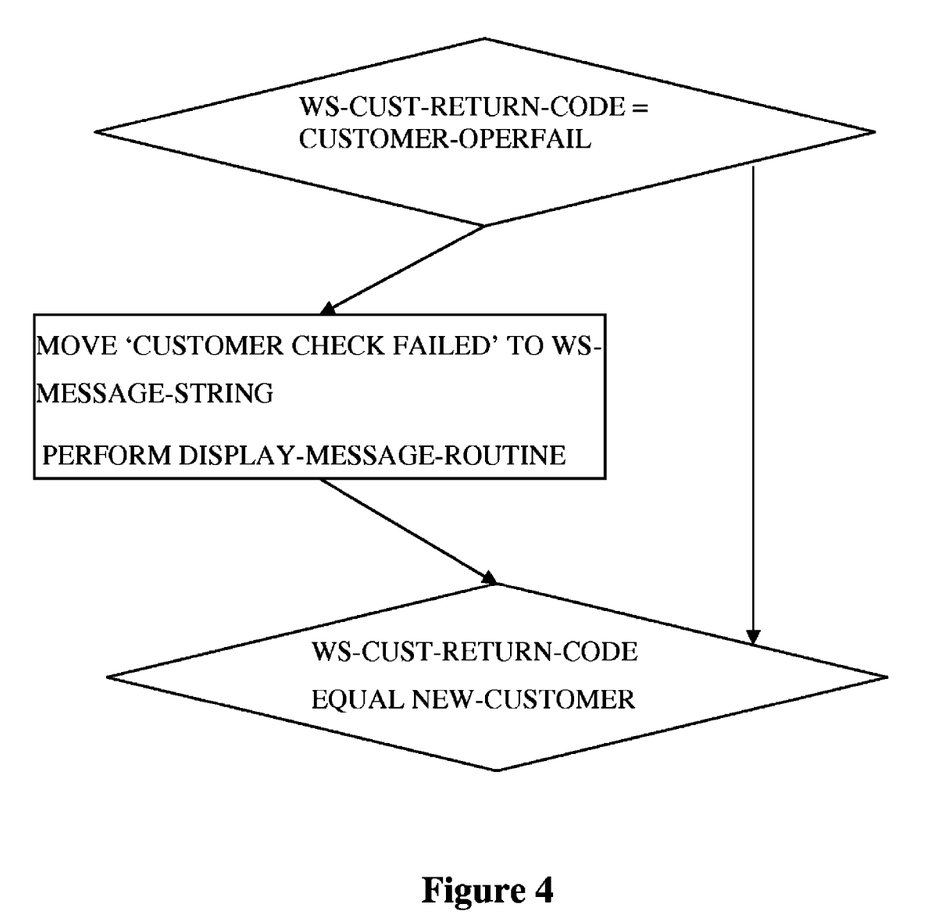
FIG. 4 illustrates a functional flowchart representing a flow between a plurality of conditional statements in the application source code.

In one implementation, a functional block of the application source code corresponding to each group and sub-group may be displayed in form of a functional flowchart for better understanding of the application source code. The user may annotate at least one of a piece of the application source code, and the conditional statement.

By way of a non-limiting example, consider a code snippet illustrated below:

CHECK-CUSTOMER
  IF  WS-CUST-RETURN-CODE=CUSTOMER-OPER-FAIL
    MOVE 'CUSTOMER CHECK FAILED' TO WS-MESSAGE-STRING
    PERFORM DISPLAY-MESSAGE-ROUTINE
      GOBACK
  IF WS-CUST-RETURN-CODE EQUAL NEW-CUSTOMER The above code snippet may be displayed in the form of the functional flowchart as shown in FIG. 4.

In another implementation of the system 102, the identification module 218 may be further configured to identify the one or more conditional statements comprising the business rule from the plurality of conditional statements added newly in the application source code. The one or more conditional statements may be further mapped to the business rule selected from at least one of the business rules stored in the pre-defined business rule template, and the business rule created using the pre-defined business rule template.

By way of a non-limiting example, consider a code snippet illustrated below. Every statement in the code snippet may be denoted by a number corresponding to the statement.

MOVE L-ACCOUNT-LASTTRDATE TO ACCOUNT-LASTTRDATE.
    1. EXEC SQL
    2. UPDATE
    3. ACCOUNT
    4. SET
    5. BALANCE=:ACCOUNT-BALANCE,
    6. LASTTRDATE=:ACCOUNT-LASTTRDATE
    7. WHERE 8. ACID=:ACCOUNT-ID
9. END-EXEC.
10. IF SQLCODE NOT=0
MOVE ACCOUNT-OPERFAIL TO ACCT-RETURN-CODE
12. ELSE
13. MOVE ACCOUNT-OPERSUCC TO ACCT-RETURN-CODE
14. END-IF.
15. UPDATE-ACCOUNT-DETAILS-UD-EXIT
16. EXIT
17. GET-TRANS-COUNT
18. * CALL 'BKPXTNIN' USING L-TRANSACT,
19. * ACCT-RETURN-CODE.
20. PERFORM GET-TRANSACTION-ID THRU GET-TRANSACTION-ID
21. EXIT
22. IF L-TRANSACTION-TYPE='T'
23. MOVE TRANSACTION-ID OF TRANSACTION1 TO
24. TRANSACTION-ID OF TRANSACTIONTFR
25. MOVE L-TGT-ACCOUNT-ID TO TFR-ACCOUNT-ID OF
26. TRANSACTIONTFR
27. * CALL 'BKPXTNIN' USING TRANSACTION-TFR,
28. * ACCT-RETURN-CODE
29. PERFORM GET-TRANSACTION-ID THRU GET-TRANSACTION-ID-
30. EXIT
31. END-IF.

Referring to the code snippet illustrated above, the business rule "sqlcode chk after performing operation1" may be mapped to the conditional statement at lines 10 and 11, "IF SQLCODE NOT=0 MOVE ACCOUNT-OPERFAIL TO ACCT-RETURN-CODE". Also, the business rule "transaction type chk" may be mapped to the conditional statement at lines 22 and 23 "IF L-TRANSACTION-TYPE='T' MOVE TRANSACTION-ID OF TRANSACTION1 TO".

Further, when the application source code may be changed due to a business need, the plurality of conditional statements may be added newly to the application source code. Thus, addition of the plurality of conditional statements to the application source code may provide a new version of the application source code. By way of a non-limiting example consider that a conditional statement is added newly between statement 21 and statement 22 resulting into a code snippet shown below:
21. EXIT
IF L-TRANSACTION-TYPE='R'
 MOVE TRANSACTION-ID OF TRANSACTION1 TO
22. IF L-TRANSACTION-TYPE='TR'
MOVE TRANSACTION-ID OF TRANSACTION1 TO In order to extract the business rule from the conditional statement added newly in the application source code, the identification module 218 may be configured to identify the conditional statement comprising the business rule only from the plurality of conditional statements added newly in the application source code. The conditional statement comprising the business rule may be further mapped by the mapping module 220. The business rule may be selected from at least one of the business rules stored in a pre-defined business rule template, and the business rule created using the pre-defined business rule template.

Further, the one or more conditional statements already mapped with the business rule in the application source code may be automatically retained. Thus, the system 102 saves computational power of the processor by performing identification and mapping of only the plurality of conditional statements added newly in the application source code.

Figure 5:
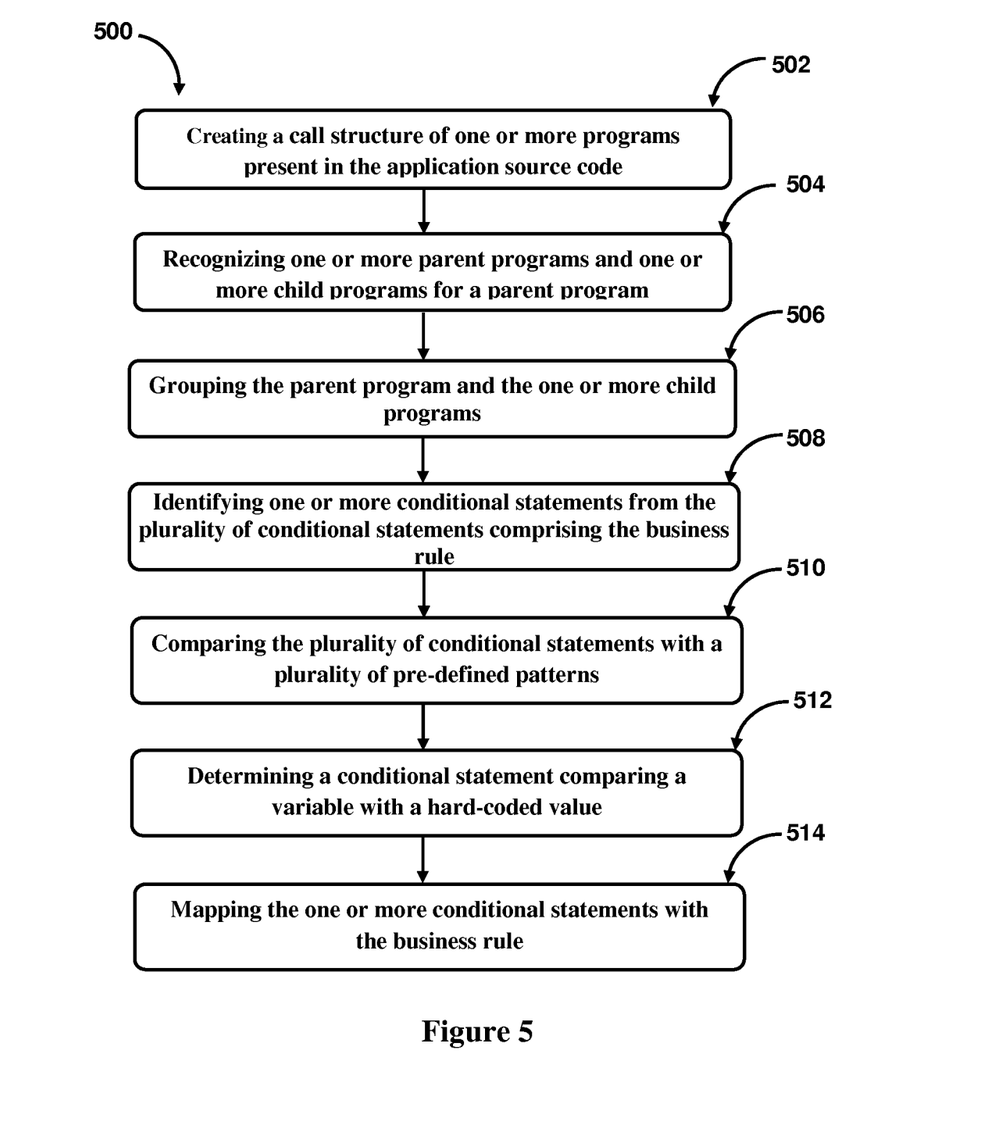
FIG. 5 illustrates a method for extracting the business rule embedded in the application source code, in accordance with an embodiment of the present subject matter.

Referring now to FIG. 5, a method 500 for extracting a business rule embedded in an application source code is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented in the above described system 102.

At block 502, a call structure of one or more programs present in the application source code may be created. In one implementation, the call structure may be created by the creating module 212.

At block 504, one or more parent programs and one or more child programs for a parent program may be recognized. In one implementation, the one or more parent programs and the one or more child programs for the parent program may be recognized by the recognizing module 214.

At block 506, the parent program and the one or more child programs may be grouped. In one implementation, the parent program and the one or more child programs may be grouped by the grouping module 216.

At block 508, one or more conditional statements from the plurality of conditional statements comprising the business rule may be identified. In one implementation, the one or more conditional statements from the plurality of conditional statements may be identified by the identification module 218.

At block 510, the plurality of conditional statements may be compared with a plurality of pre-defined patterns. In one implementation, the plurality of conditional statements may be compared with a plurality of pre-defined patterns by the identification module 218.

At block 512, a conditional statement comparing a variable with a hard-coded value may be determined. In one implementation, the conditional statement comparing the variable with the hard-coded value may be determined by the identification module 218.

At block 514, the one or more conditional statements may be mapped with the business rule. In one implementation, the one or more conditional statements may be mapped with the business rule by the mapping module 220.

Although implementations for methods and systems for extracting the business rule embedded in the application source code have been described in language specific to structural features and/or methods, it is to be understood that the appended claims are not necessarily limited to the specific features or methods described. Rather, the specific features and methods are disclosed as examples of implementations for extracting the business rule embedded in the application source code.

What is claimed is:

1. A computer implemented method for extracting a business rule embedded in an application source code, the method comprising:

creating, by a processor, a call structure of one or more programs present in an application source code by performing a control flow analysis on the application source code, wherein the control flow analysis is performed using at least one of abstract representation, resolving of a dynamic call, object resolution, and a control transfer to determine a control flow between the one or more programs;

recognizing, from the one or more programs, one or more parent programs and one or more child programs for the parent program based on the call structure, wherein the parent program is capable of calling the one or more child programs; and wherein the call structure enables a recognizing module for establishing at least one of a relation and dependency between the one or more programs;

grouping, by the processor, the parent program and the one or more child programs, each program in the group including a plurality of conditional statements, wherein the grouping is performed based on a plurality of identical characteristics of the one or more child programs and wherein the identical characteristics comprise the one or more programs starting with same naming convention;

identifying, by the processor, one or more conditional statements among the plurality of conditional statements, wherein the one or more conditional statements comprise a business rule, and wherein the one or more conditional statements are identified by:

comparing the plurality of conditional statements with a plurality of pre-defined patterns identified from the application source code, wherein the plurality of pre-defined patterns comprise at least one pattern associated with the business rule, and at least another pattern lacking the business rule, or comparing a variable with a hard-coded value;

generating a hierarchy of the conditional statements, wherein the hierarchy defines one or more parent conditional statements and one or more child conditional statements dependent on the parent conditional statements, wherein the parent conditional statements and the child conditional statements are nested conditions occurring in a plurality of sub-entities; and extracting a business rule embedded in the application source code, by mapping the one or more conditional statements with a business rule selected among business rules stored in a pre-defined business rule template and a business rule created using the pre-defined business rule template.

2. The method of claim 1, wherein the pre-defined business rule template is defined for a plurality of business domains, wherein the plurality of business domains comprise rating, insurance, and pharmacy.

3. The method of claim 1, wherein the mapping further comprises mapping related conditional statements to the business rule, wherein the related conditional statements comprise the parent conditional statements and the child conditional statements, the one or more conditional statements comparing the variable with a hard coded value.

4. The method of claim 1, wherein the pre-defined template comprises configurable parameters including at least one of a parameter name, a parameter type, or a mandatory flag.

5. The method of claim 4, wherein the parameter name comprises at least one of a rule name, a rule description, a rule ID, or a rule type.

6. The method of claim 4, wherein the parameter type comprises at least one of a text box, a text area, or a control field.

7. The method of claim 4, wherein the mandatory flag is set to at least a yes or a no.

8. The method of claim 1, wherein the identifying further comprises identifying the one or more conditional statements from a plurality of conditional statements newly added in the application source code.

9. The method of claim 8, wherein the one or more conditional statements are further mapped to the business rule selected among the business rules stored in the pre-defined business rule template and the business rule created using the pre-defined business rule template.

10. A computer implemented system for extracting a business rule embedded in an application source code, the system comprising:

a processor; and a memory coupled to the processor, wherein the processor is capable of executing a plurality of modules stored in the memory, the plurality of modules comprising:

a creating module configured to create and analyze a call structure of one or more programs present in an application source code by performing a control flow analysis on the application source code, wherein the control flow analysis is performed using at least one of abstract representation, resolving of a dynamic call, object resolution, and a control transfer to determine a control flow between the one or more programs;

a recognizing module configured to identify, from the one or more programs, one or more parent programs and one or more child programs for the parent program based on the call structure, wherein the parent program is capable of calling the one or more child programs and using the call structure to enable the recognizing module to establish at least one of a relation and dependency between the one or more programs;

a grouping module configured to group the parent program and the one or more child programs, each program in the group including a plurality of conditional statements, wherein the grouping is performed based on a plurality of identical characteristics of the one or more child programs and wherein the identical characteristics comprise the one or more programs starting with same naming convention;

an identification module configured to identify one or more conditional statements among the plurality of conditional statements, wherein the one or more conditional statements comprise a business rule, and wherein the identification module is further configured to identify the one or more conditional statements by:

comparing the plurality of conditional statements with a plurality of pre-defined patterns identified from the application source code, wherein the plurality of pre-defined patterns comprises at least one pattern associated with the business rule, and at least another pattern lacking the business rule, or comparing a variable with a hard-coded value;

generating a hierarchy of the conditional statements, wherein the hierarchy defines one or more parent conditional statements and one or more child conditional statements dependent on the parent conditional statements, wherein the parent conditional statements and the child conditional statements are nested conditions occurring in a plurality of sub-entities; and extracting a business rule embedded in the application source code, by a mapping module configured to map the one or more conditional statements with a business rule selected among business rules stored in a pre-defined business rule template and a business rule created using the ore-defined business rule template.

11. The system of claim 10, wherein the pre-defined business rule template is defined for a plurality of business domains, wherein the plurality of business domains comprise rating, insurance, and pharmacy.

12. The system of claim 10, wherein the mapping module is further configured to map related conditional statements to the business rule, wherein the related conditional statements comprises the parent conditional statements and the child conditional statements, the one or more conditional statements comparing the variable with hard coded value.

13. The system of claim 10, wherein the pre-defined template comprises configurable parameters including at least one of a parameter name, a parameter type, or a mandatory flag.

14. The system of claim 13, wherein the parameter name comprises rule name, rule description, rule id, and rule type.

15. The system of claim 13, wherein the parameter type comprises at least one of a text box, a text area, or a control field.

16. The system of claim 13, wherein the mandatory flag is set to at least a yes or a no.

17. The system of claim 10, wherein the identification module is further configured to identify the one or more conditional statements from a plurality of conditional statements newly added in the application source code.

18. The system of claim 17, wherein the one or more conditional statements are further mapped to the business rule selected among the business rules stored in the pre-defined business rule template and the business rule created using the pre-defined business rule template.

19. A non-transitory computer readable medium comprising a program executable in a computing device for extracting a business rule embedded in an application source code, the program comprising:

a program code for creating and analyzing a call structure of one or more programs present in an application source code by performing a control flow analysis on the application source code, wherein the control flow analysis is performed using at least one of abstract representation, resolving of a dynamic call, object resolution, and a control transfer to determine a control flow between the one or more programs;

a program code for recognizing, from the one or more programs, one or more parent programs and one or more child programs for the parent program based on the call structure, wherein the parent program is capable of calling the one or more child programs and using the call structure to enable a recognizing module for establishing at least one of a relation and dependency between the one or more programs;

a program code for grouping the parent program and the one or more child programs, each program in the group including a plurality of conditional statements, wherein the grouping is performed based on a plurality of identical characteristics of the one or more child programs and wherein the identical characteristics comprise the one or more programs starting with same naming convention;

a program code for identifying one or more conditional statements among the plurality of conditional statements, wherein the one or more conditional statements comprise a business rule, and wherein the one or more conditional statements are identified by performing at least one of, comparing the plurality of conditional statements with a plurality of pre-defined patterns identified from the application source code, wherein the plurality of predefined patterns comprises at least one pattern associated with the business rule, and at least another pattern lacking the business rule, or comparing a variable with a hard-coded value;

a program code for generating a hierarchy of the conditional statements, wherein the hierarchy defines one or more parent conditional statements and one or more child conditional statements dependent on the parent conditional statements, wherein the parent conditional statements and the child conditional statements are nested conditions occurring in a plurality of sub-entities; and extracting a business rule embedded in the application source code by a program code for mapping the one or more conditional statements with a business rule selected among business rules stored in a pre-defined business rule template and a business rule created using the pre-defined business rule template.

* * * * *